Patented Sept. 19, 1933

1,927,103

UNITED STATES PATENT OFFICE 1,927,103

AZODYESTUFF

Carl Taube, Leverkusen-I. G.-Werk, and Josef Hilger, Leverkusen-Wiesdorf, Germany, assignors to General Aniline Works, Inc., New York, N. Y., a corporation of Delaware No Drawing. Application October 12, 1932, Serial No. 637,550, and in Germany October 17, 1931

4 Claims. (Cl. 260—75)

The present invention relates to new azo-dyestuffs, more particularly it relates to dyestuffs which may be represented by the probable general formula:

B—N=N—A—N=N—C—N=N—D wherein "A" stands for the radical of a tetrazotized p.p'-diaminodiphenyl, "B" stands for the radical of an ortho-hydroxy-carboxylic acid of the benzene series, "C" stands for the radical of a diazotized 1-amino-2-naphtholether or a sulfonic acid thereof and "D" stands for a radical of a 1-amino-8-naphthol-sulfonic acid or an N-substitution product thereof.

As compounds standing for "A" there may be mentioned by way of example, benzidine, tolidine, dichlorobenzidine, dianisidine, benzidinemono- and -disulfonic acids, benzidinemono- and -dicarboxylic acids and benzidinesulfone of the formula:

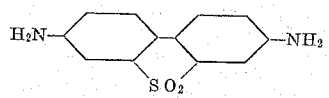

"B" stands, for example, for salicylic acid and cresotinic acid, "C" stands, for example, for the methyl, ethyl, propyl, benzyl, hydroxyethyl or glycol ether of 1-amino-2-naphthol or its 6- or 7-sulfonic acids or the acid sulfuric acid ester of the hydroxyethyl- or glycol ether, "D" stands for example for 1-amino-8-naphthol-4-sulfonic acid, -2.4-disulfonic acid, -3.6-disulfonic acid, -4.6-disulfonic acid or an N-substitution product thereof, such as an N-alky-, -aralkyl-, -aryl- or -acyl-substitution product, for example for a 1-ethylamino-, 1-benzylamino-, 1-phenylamino-, 1-acetylamino- or 1-benzoylamino-8-naphthol-mono- or -disulfonic acid.

Our new dyestuffs are obtainable in a convenient manner by tetrazotizing a p.p-diaminodiphenyl, coupling on the one side with an ortho-hydroxy-carboxylic acid of the benzene series, further coupling the intermediate product with a 1-amino-2-naphtholether or a 6- or -7-sulfonic acid thereof, diazotizing the aminodisazo-dyestuff obtained and finally coupling with one molecular proportion of a 1-amino-8-naphthol-sulfonic acid or an N-substitution product thereof.

Our new dyestuffs are in form of their alkali metal salts generally dark powders, soluble in water, dyeing cotton generally clear green shades of good fastness properties.

The invention is illustrated by the following examples, without being limited thereto:

*Example 1.*—18,6 parts by weight of benzidine-hydrochloride are diazotized in the usual manner with 10 parts by weight of sodium nitrite and hydrochloric acid. The tetrazo solution thus obtained is rendered alkaline and coupling is performed in alkaline solution with 11,0 parts by weight of salicylic acid; then the solution is rendered acid to acetic acid and coupling is performed with 1-amino-2-naphtholethylether-6-sodium sulfonate. The aminodisazodyestuff formed is isolated, washed with dilute aqueous acetic acid, dissolved in water and diazotized in the usual manner with excess sodium nitrite and hydrochloric acid; the diazo compound formed is filtered and coupled in dilute pyridine solution with 1-acetylamino-8-naphthol-3.6-disulfonic acid. The dyestuff having in the free state the following formula:

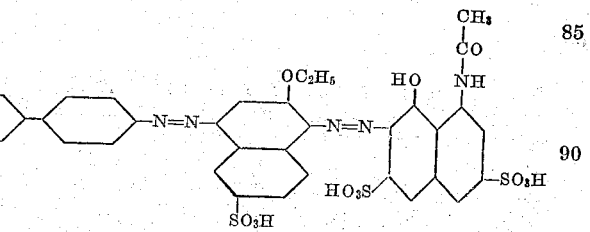

dyes cotton from a Glauber's salt bath powerful green shades.

By substituting the 1-acetylamino-8-naphthol-3.6-disulfonic acid by 1-benzoylamino-8-naphthol-3.6-disulfonic acid a dyestuff having similar properties is obtained.

*Example 2.*—10 parts by weight of o-tolidine-hydrochloride are tetrazotized in the usual manner and coupled in soda alkaline solution on one side with salicylic acid. Then the solution is rendered acid to acetic acid and the second diazo group is coupled with 1-amino-2-naphthol-glycol ether-mono-sulfuric acid ester. The aminodisazodyestuff formed is isolated in the usual manner, dissolved in aqueous ammonia, then sodium nitrite is added and the solution is rendered acid to Congo by the addition of hydrochloric acid. diazo compound is isolated and the final coupling is performed with 1-acetylamino-8-naphthol-3.6-disulfonic acid in dilute aqueous pyridine solution.

The dyestuff having in the free state the following formula:

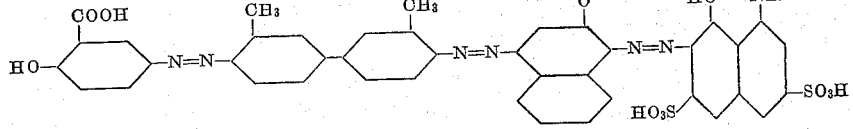

dyes cotton from a Glauber's salt bath green shades.

Dyestuffs having similar properties are obtained when substituting the salicylic acid by o-cresotinic acid of the formula:

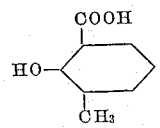

or by substituting the 1-acetylamino-8-naphthol-3.6-disulfonic acid by 1-acetylamino-8-naphthol-4.6-disulfonic- or 4-monosulfonic acid or by 1-benzoylamino-, 1-ethylamino- or 1-phenylamino-8-naphthol-3.6-, or 4.6-disulfonic acid or 4-monosulfonic acid.

Example 3.—10 parts by weight of 3.3′-dichlorobenzidine are tetrazotized in hydrochloric acid solution, coupled on the one side with salicylic acid in soda alkaline solution and on the other side with 1-amino-2-naphtholglycolether-mono-sulfuric acid ester in acetic acid solution.

The aminodisazodyestuff formed is isolated, dissolved in dilute aqueous ammonia, sodium nitrite is added thereto, and the solution is rendered acid to Congo by the addition of hydrochloric acid. The diazo compound formed is filtered and coupled in dilute aqueous pyridine with 1-acetylamino-8-naphthol-3.6-disulfonic acid. The dyestuff having in the free state the following formula:

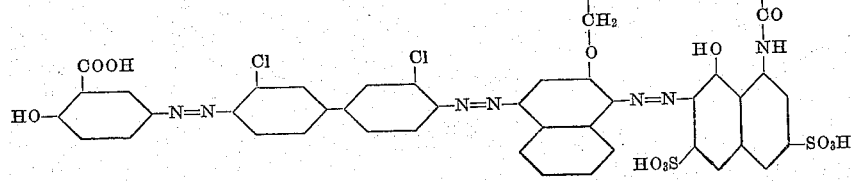

dyes cotton from a Glauber's salt bath olive green shades.

Dyestuffs having similar properties are obtained when substituting the dichlorobenzidine by benzidine-3-sulfonic acid, 3.3′-disulfonic acid and 3.3′-dicarboxylic acid, or by substituting the esterified naphtholether by 1-amino-2-benzyloxy- or 1-amino-2-phenoxy-naphthalene-6- or 7-sulfonic acid.

We claim:
1. The azodyestuffs of the probable general formula:

B—N=N—A—N=N—C—N=N—D, wherein "A" stands for the radical of a tetrazotized p.p′-diaminodiphenyl, "B" stands for the radical of an ortho-hydroxy-carboxylic acid of the benzene series, "C" stands for the radical of a diazotized 1-amino-2-naphtholether, which may be substituted by a sulfonic acid group in the 6- or 7-position and "D" stands for the radical of a 1-amino-8-naphthol-sulfonic acid or an N-substitution product thereof, being in form of their alkali metal salts generally dark powders, soluble in water and dyeing cotton generally clear green shades of good fastness properties.

2. The azodyestuffs of the probable general formula:

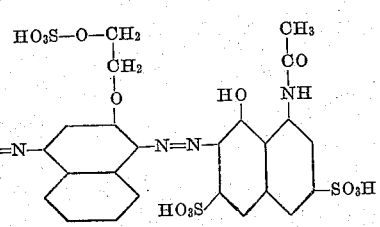

wherein "$x$" stands for a radical of the alkyl series "$y$" and "$y'$" stand for hydrogen, alkyl, alkoxy, halogen, the sulfonic acid group or the carboxylic acid group, one "$z$" stands for hydrogen and the other "$z$" stands for hydrogen or the sulfonic acid group, "$p$" stands for hydrogen or an acyl group, "$n$" stands for the number one or two, and wherein the benzene nucleus "R" may be substituted by alkyl, being in form of their alkali metal salts generally dark powders, soluble in water and dyeing cotton generally clear green shades of good fastness properties.

3. The azodyestuffs of the probable general formula:

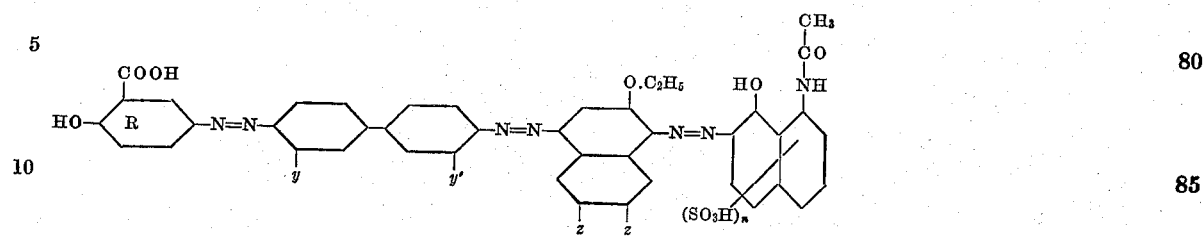

wherein "$y$" and "$y'$" stand for hydrogen, alkyl, alkoxy, halogen, the sulfonic acid group or the carboxylic acid group, one "$z$" stands for hydrogen and the other "$z$" stands for hydrogen or the sulfonic acid group, "$n$" stands for the number one or two, and wherein the benzene nucleus "R" may be substituted by alkyl, being in form of their alkali metal salts generally dark powders, soluble in water and dyeing cotton generally clear green shades of good fastness properties.

4. The azodyestuff of the following formula:

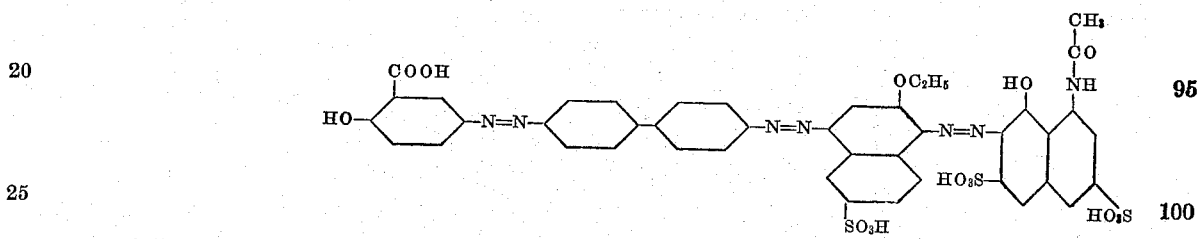

dyeing cotton from a Glauber's salt bath powerful green shades.

CARL TAUBE.
JOSEF HILGER.